United States Patent [19]

Chen

[11] Patent Number: 5,178,404
[45] Date of Patent: Jan. 12, 1993

[54] CONTRACTION CONTROLLER FOR COLLAPSIBLE TYPE CONTRACTIBLE BAGGAGE CART

[76] Inventor: Johnson Chen, 5Fl., No. 3, Lane 416, Hsi-Sheng St., Hsin-Chuang City, Taipei Hsien, Taiwan

[21] Appl. No.: 818,356

[22] Filed: Jan. 9, 1992

[51] Int. Cl.⁵ .............................................. B62B 1/12
[52] U.S. Cl. ...................................... 280/655; 280/652; 280/655.1; 280/659
[58] Field of Search ................ 280/655, 655.1, 659, 280/651, 652, 654, 35, 638

[56] References Cited

U.S. PATENT DOCUMENTS

| | | | |
|---|---|---|---|
| 3,998,476 | 12/1976 | Kazmark, Sr. | 280/655 |
| 4,591,183 | 5/1986 | Gordon et al. | 280/655 |
| 4,896,897 | 1/1990 | Wilhelm | 280/655 |
| 4,974,871 | 12/1990 | Mao | 280/651 |

Primary Examiner—Eric D. Culbreth
Attorney, Agent, or Firm—Bacon & Thomas

[57] ABSTRACT

A controller for contracting the collapsible rods of a baggage carrier wherein a spring-biased sliding element carried by the controller body is pushed downwardly to cause retraction of stop members provided on the rods, thereby permitting the rods to be quickly collapsed into each other when a handle mounted at the top of the rods is also pushed downwardly.

1 Claim, 3 Drawing Sheets

CONTRACTION CONTROLLER FOR COLLAPSIBLE TYPE CONTRACTIBLE BAGGAGE CART

BACKGROUND OF THE INVENTION

The present invention relates to a structure for a collapsible type contractible baggage cart, and particularly to a controller for a contraction of collapsible type baggage cart.

There are many kinds of baggage carts in the market for carrying of baggage during traveling. Most of such baggage carts are collapsible to save space requirement for their storage. However, the security and contractibility of their contractible rods are always problems of the conventional baggage carts, because each of their contractible rods is composed of two sections, and it is not easy to secure these two sections together after extension, and the contractible rods can not be secured unless they have been extended to a certain length. Moreover, it has been impossible to extend a rod composed of several sections by one extension, and such sections have to be retracted one by one after using, which means that a control button to control its contraction has to be pushed repeatedly. Hence, use of the conventional contractible baggage carts is not convenient, and their use is not sufficiently safe. In view of the above defects, the inventor has created a new structure of a contraction controller for a collapsible type contractible baggage cart.

SUMMARY OF THE INVENTION

The main objective of the present invention provides a contraction controller for a collapsible type contractible baggage cart. It includes a controller body for use in combination with two contraction rods, each rod containing three section, a lower pipe portion, an intermediate pipe portion, and an upper pipe portion, with a contraction stop at each joint. The controller body comprises a base board, a sliding element and a pushing plate located on the top of the lower pipe elements, in which the sliding element has two posts extending out of the controller body and subject to pushing of the pushing plate. The base board has a pair of symmetric posts corresponding to another pair of posts extending downwards from the top of the controller body for installation of springs in order to support the sliding element for vertical displacement, and arranged in such way that by pushing of the pushing plate, the sliding element is displaced downwards to force the contraction stops to retract and, consequently, the contraction rods to retract for collapsing of the carrier.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENTS

Figure 1:
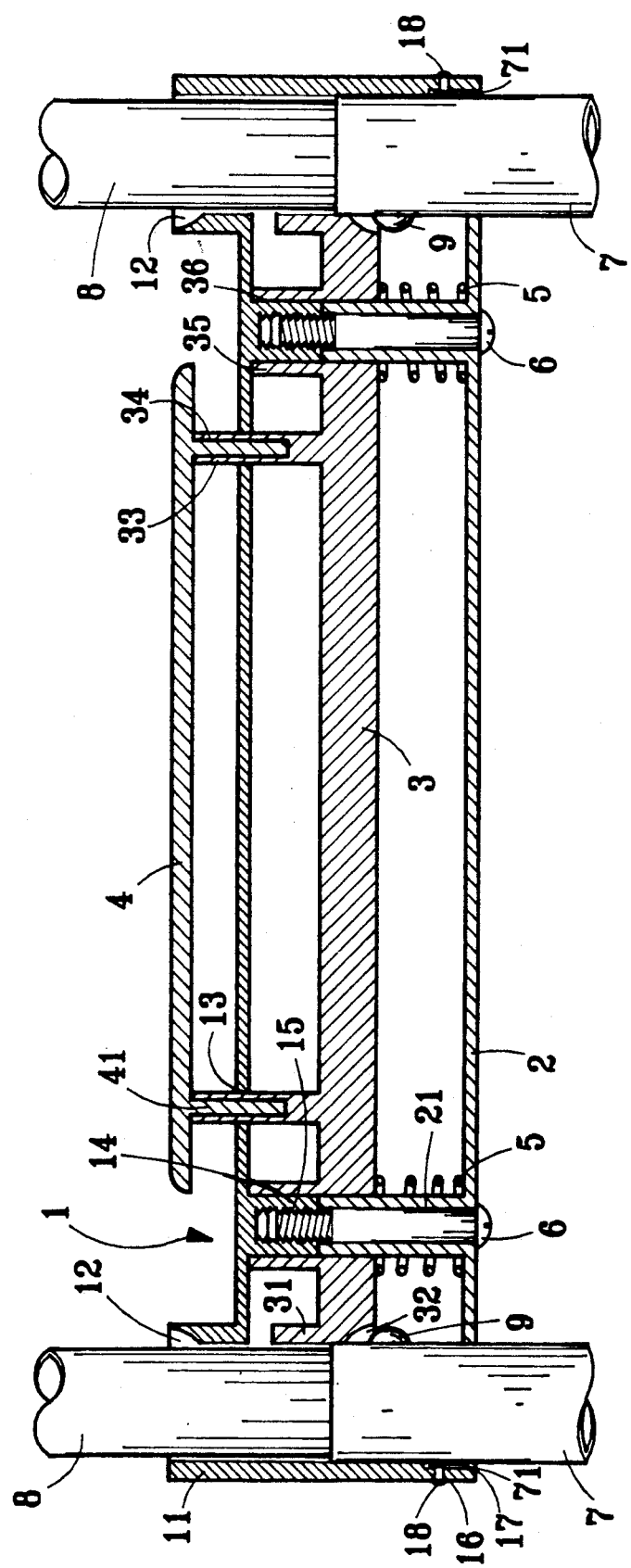
FIG. 1 is a front sectional view of a contraction controller for a collapsible type contractible baggage cart before it is pushed according to the present invention.
Figure 3:
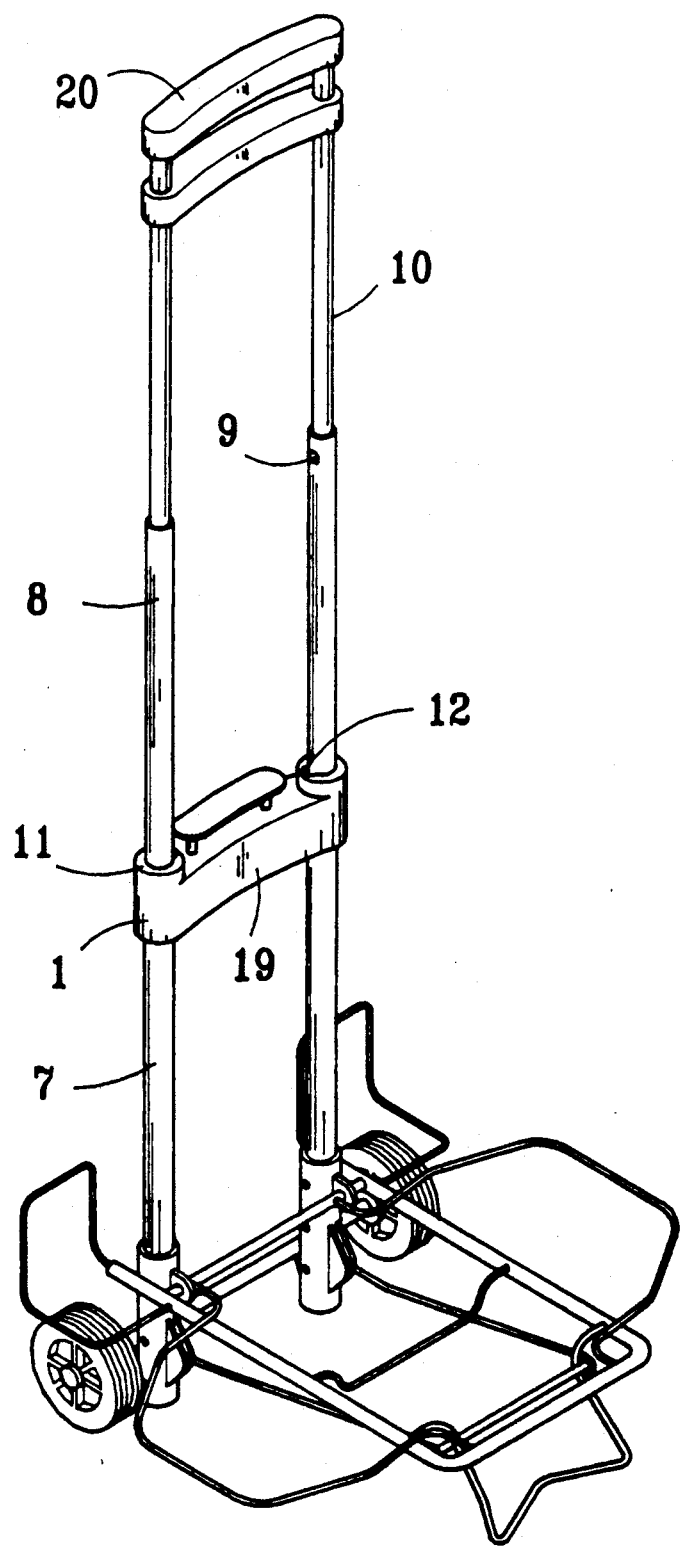
FIG. 3 is a perspective view of an embodiment of the collapsible type contractible baggage cart according to the present invention.

As shown in FIGS. 1 and 3, the contraction controller for a collapsible type contractible baggage cart according to the present invention includes a hollow controller body (1) placed across a pair of contractible rods of a baggage cart at the upper portions of their respective lower pipe elements (7). The hollow controller body (1) has a U-shaped recess in the middle, and an annular portion (11) at each end for insertion of a lower pipe element (7). A small block (17) is formed at the lower part of the outer side of each annular portion (11) for fitting of a small fixing plate (71) extending from the lower pipe element (7). The small fixing plate (71) is fixed by means of a pin (18) inserted into a hole (16) at the small block (17) so that the controller body (1) is fixed in place. A contraction stop (9) pushed by a spring plate located in an inner opening position is provided between the lower pipe element (7) and the intermediate pipe element (8) of each contraction rod to secure these two pipe elements (7 and 8) in a manner that extension and retaining of the intermediate pipe element (8) from the lower pipe element (7) can be done instantly. A same contraction stop (9) is provided between the upper pipe element (10) and the intermediate pipe element (8) for the same purpose. Hence, while using the baggage cart according to the present invention, only a handle (20) located on the top of the upper pipe elements (10) has to be pulled upwards to extend the upper pipe element (10) from the intermediate pipe element (8), and then the intermediate pipe element (8) from the lower pipe element (7). Following such extensions, the upper pipe element (10) is secured to the intermediate pipe element (8) by the contraction stop (9), and the intermediate pipe element (8) is secured to the lower pipe element (7) by another contraction stop (9). These contraction stops (9), which serve as mechanism to control extension and contraction, can be projected further to assure firm fixing of these pipe elements, and consequently shifting and disengagement of these pipe elements are prevented.

The hollow controller body (1) is a symmetric structure, and hence only one side of which is required to be described herein. On the top of the annular portion (11) there is an oblique notch (12) to receive the stop (9). To facilitate carriage of baggage, the hollow controller body (1) has a slightly arched profile including a sliding element (3), a base board (2) and a pushing plate (4) on the top. The base board (2) is a thin board with a post (21) extending upwards from an appropriate position at a side near the adjacent contraction rod. A corresponding post (14) extends downwards from the bottom of the upper side of the controller body (1) in a way that these two posts (21 and 14) engage with each other for passing of a screw (6) with thread at its top end through a hollow space of the post (21) to a recess (15) in the post (14), with the threaded portion being locked in the recess (15) so that the base board (2) is locked to the controller body (1). The sliding element (3) has a U-shaped channel located within the controller body (1) and supported by a spring (5) on the base board (2) at each end of the controller body (1). An intermediate post (35) extends from each end of the sliding element (3) at a position corresponding to the posts (14 and 21) in a manner that a hollow portion (36) of the intermediate post (35) surrounds the posts (14 and 21) to permit vertical sliding of the sliding element (3) along the posts (14 and 21). A long column (33) is designed at beside the intermediate post (35). The column (33) projects upward through an opening (13) formed on the surface of the controller body (1). On the column (33) there is a slot (34) for insertion of a connecting post (41) extending downwards from the bottom of the pushing plate (4). The pushing plate (4) is an arched thin plate with a round edge at each end to drive the sliding element (3) to displace. There is an arched piece (31) at each end of the sliding element (3) to contact with the lower pipe element (7). At the lower side of each arched piece (31) there is an oblique slot (32) for reception of stop (9) for the intermediate pipe element (8).

Figure 2:
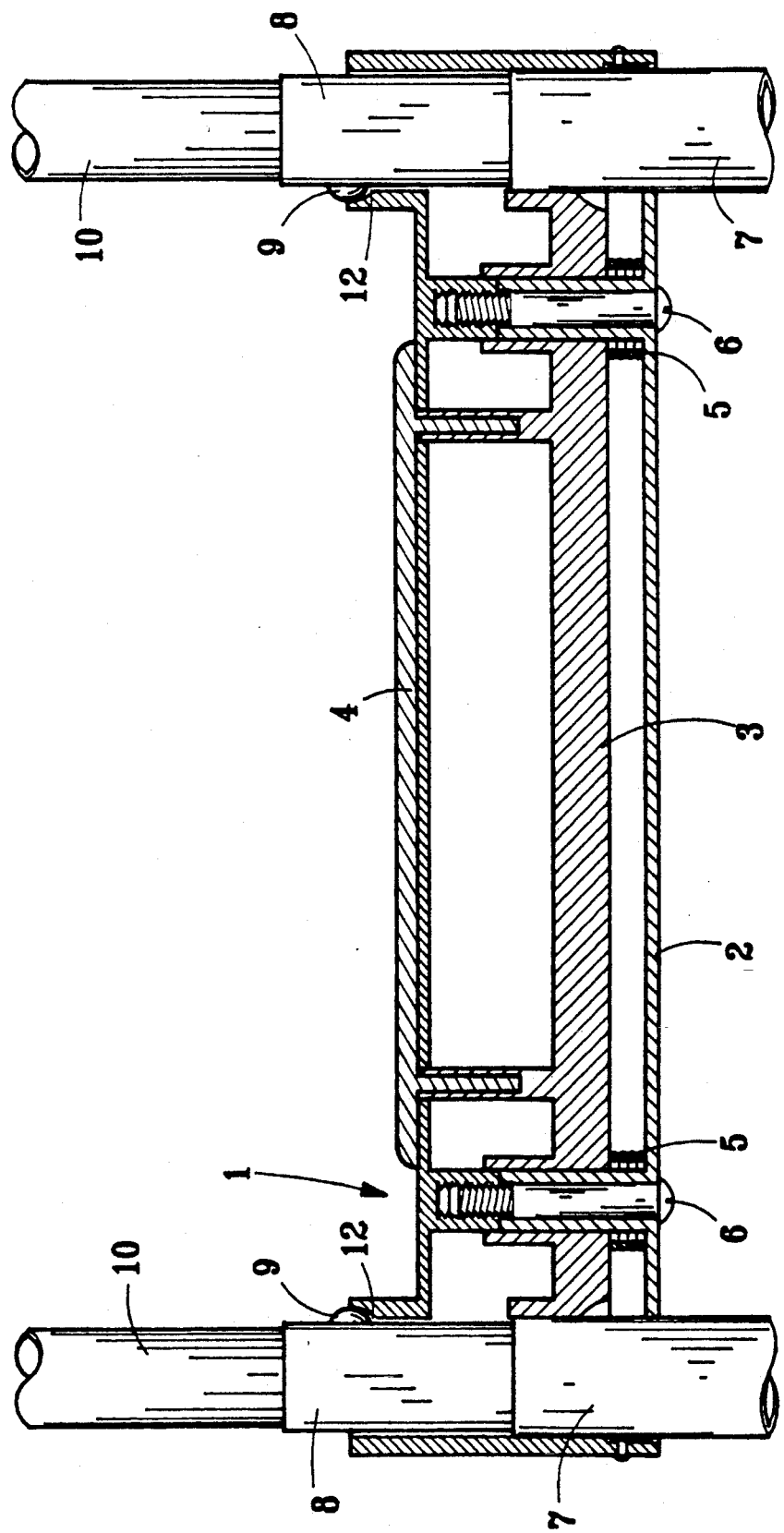
FIG. 2 is a front sectional view of a contraction controller for a collapsible type contractible baggage cart after it is pushed according to the present invention.

As shown in FIG. 2, to retract the contraction rods, the pushing plate (4) is pushed so as the sliding element (3) is slid downwards to compress the springs (5) till arched portions (31) with the oblique slots (32) force the respective contraction stops (9) to enter the respective lower pipe elements gradually, while the handle (20) is pushed downwards so that the outer wall of each intermediate pipe element (8) retains and prevents a contraction stop from projecting outwards, and consequently the respective intermediate pipe elements (8) immediately telescope within the respective lower pipe elements (7). On the other hand, each oblique notch (12) forces an upper contraction stop (9) to retract gradually so that the upper pipe elements (10) can retain the respective upper contraction stops (9) within the intermediate pipe elements (8) when they are retracted and telescoped into the intermediate pipe elements (8). The above description is a breakdown of the retraction process. Actually, the contraction rods are fully retracted within one second after pushing of the pushing plate (4) with a hand and pushing down of the handle (20) with another hand. The design of the notches (12) and slots (32) will not interfere with the extension of the contraction rods, and the design of the contraction stops (9) can assist extension of the contraction rods. It is a simple but efficient controller comprising only a few parts.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

What is claimed is:

1. A collapsible baggage carrier provided with a contraction controller comprising:
   a) a pair of contraction rod assemblies including a first end portion and a second end portion, a handle secured to the first end portion, a wheeled carrier frame secured to the second end portion and a controller body secured to the rod assemblies between the first and second end portions;
   b) each contraction rod assembly including a lower pipe portion, an intermediate pipe portion and an upper pipe portion capable of retraction and extension, a first spring biased stop member for maintaining the upper and intermediate pipe portions in a position of extension and a second spring biased stop member for maintaining the intermediate and lower pipe portions in a position of extension;
   c) the controller body including a top portion provided with a pair of spaced openings formed therein, a pair of first hollow posts extending downwardly from the top portion, a pair of annular portions at opposite ends of the body, the rod assemblies being disposed through the annular portions, means for securing the lower pipe portion of each rod assembly to its corresponding annular portion and an oblique notch formed in each annular portion for engagement by the first stop members;
   d) a base board including a second pair of hollow posts extending upwardly therefrom and disposed in alignment with the first pair of hollow posts, fastening means disposed in the first and second pairs of hollow posts for securing the base board to the controller body;
   e) a sliding element including a pair of arched portions at opposite ends thereof, each arched portion provided with an oblique notched formed therein for engagement by the second stop members, a pair of third hollow posts extending upwardly from the sliding element, the third hollow posts receiving the aligned first and second hollow posts therein to permit sliding of the sliding element along the first and second hollow posts, a pair of columns extending upwardly from the sliding element and through the openings of the top portion of the controller body, a pushing plate secured to the columns and spring means for biasing the sliding element away from the base board; and
   f) wherein when downward force is applied to the pushing plate, the sliding element is caused to move downwardly against the spring biasing means and cause the oblique notches of the sliding element to engage and release the second stop members, and permit the intermediate pipe portions to retract within the lower pipe portions, and when downward force is applied to the handle, the oblique notches of the annular portions engage and release the first stop members to permit the upper pipe portions to retract within the intermediate pipe portions, thereby causing collapsing of the baggage carrier.

* * * * *